United States Patent [19]
Bala et al.

[11] 3,747,085
[45] July 17, 1973

[54] TOOL MONITORING APPARATUS

[75] Inventors: John L. Bala, Stow; Peter W. Ford, Winchester, both of Mass.

[73] Assignee: Itek Corporation, Lexington, Mass.

[22] Filed: Nov. 3, 1971

[21] Appl. No.: 195,397

[52] U.S. Cl. ......... 340/267 R, 324/34 Ps, 340/282, 408/6
[51] Int. Cl. ......................................... G08b 21/00
[58] Field of Search .............. 340/267 R, 282, 271, 340/195, 421; 408/6; 324/34 PS, 41

[56] References Cited
UNITED STATES PATENTS

| 2,587,664 | 3/1952 | Stout | 324/41 X |
| 3,133,457 | 5/1964 | Martens | 340/267 R X |
| 3,339,434 | 9/1967 | Sparling | 340/267 R X |
| 667,123 | 1/1901 | Freed | 340/276 |
| 3,310,796 | 3/1967 | Sanders | 340/271 |

Primary Examiner—David L. Trafton
Attorney—Homer O. Blair, Robert L. Nathans and Gerald H. Glanzman

[57] ABSTRACT

Apparatus for monitoring the condition of a tool and for detecting the improper operation thereof. The apparatus utilizes a magnetic circuit formed of a first low reluctance portion and a second high reluctance portion having a pulsating magnetic flux induced therein. In normal operation, the tool to be monitored is adapted to be positioned within and substantially bridge the high reluctance portion, which preferably comprises an air gap, and become a part of the circuit thus greatly lowering its reluctance. Appropriate electronics are provided to monitor abrupt and significant increases in the reluctance due to withdrawal of the tool from the air gap caused by breakage or loss of the tool. The sensing portion of the apparatus is manufactured as an enclosed unit which may be adapted to monitor tools of various types and sizes.

8 Claims, 4 Drawing Figures

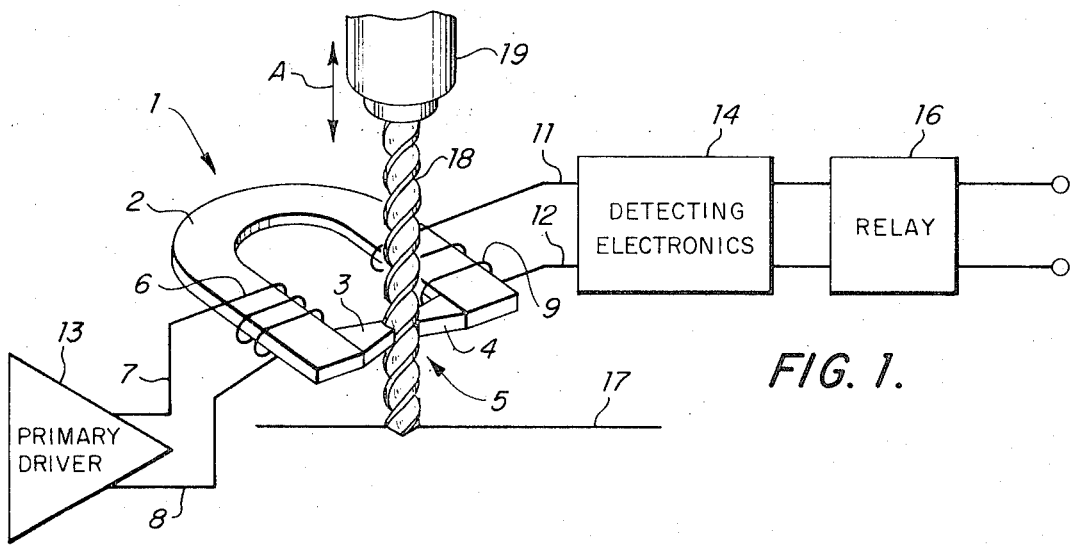
FIG. 1.
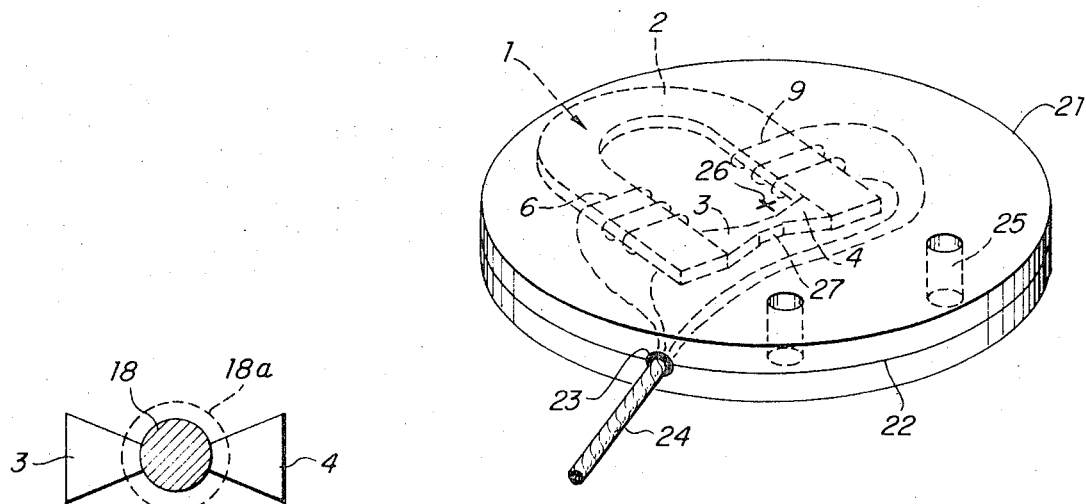
FIG. 3.
FIG. 2.
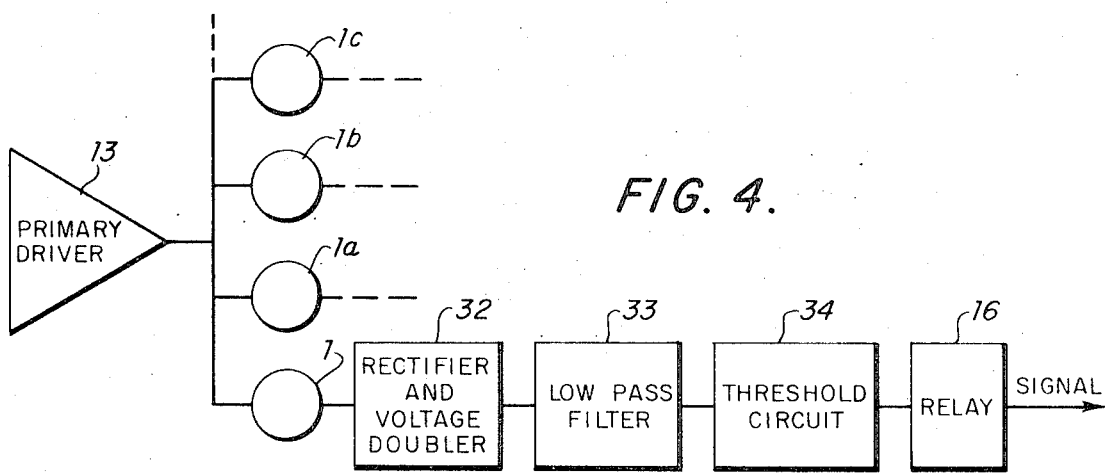
FIG. 4.

TOOL MONITORING APPARATUS

BACKGROUND OF THE INVENTION

1. Field of the Invention

The present invention relates generally to tool monitoring apparatus. More particularly, the present invention relates to apparatus for detecting and indicating the existence of broken, damaged, or otherwise improperly operating tools in automated machine tool equipment.

2. Description of the Prior Art

In order to enable the mass production of many articles in a reliable manner and at a reasonable cost, many manufacturing concerns find it advantageous to utilize large multi-purpose machine tools which are capable of performing a plurality of separate manufacturing operations on a large number of work pieces in a repetitive and fully automatic manner without necessitating close human supervision. For example, a typical machine tool may consist of a plurality of drills, punches, or other tools which are positioned to sequentially operate upon a large number of work pieces as they pass through the machine.

In high volume production machines of this type, the breakage or improper operation of a single tool within the machine will usually be enough to produce a defective work piece. Furthermore, the failure to immediately detect the problem will permit a large number of defective work pieces to be produced and can also result in serious damage to the machine itself. This can stop production,, idle employees, necessitate expensive repairs, and have other serious repurcussions. Accordingly, there is a great need for a system which can effectively monitor the condition of a machine tool as it is in operation, detect whenever an element of the tool becomes defective or broken, and then either automatically shut the machine down or inform an operator of the problem.

A variety of devices to accomplish this goal are described in the prior art and employ diverse methods of detection. These devices utilize timers (U.S. Pat. No. 3,339,434), air pressure guages (U.S. Pat. No. 3,241,402), axial thrust sensors (U.S. Pat. No. 3,299,697) permanent magnets having their field affected by drill rotation (U.S. Pat. No. 3,310,796) inductance coils forming part of an oscillator circuit (U.S. Pat. No. 3,001,421) and other systems. In general, however, they have not been fully satisfactory. For one thing, many of them are too easily affected by the surrounding environment making them unsuitable for many operations. In drilling operations, for example, metal chips, coolants and the like are generally present in the area of the monitoring apparatus and can often cause erroneous signals. Furthermore, many of these devices must be essentially custom-made for the particular tool it is to monitor and cannot be utilized with tools of different shapes or sizes without significant modification or adjustment. This tends to make them quite expensive to construct, and since a typical machine tool may employ a large number of separate tools performing different operations, the cost to the company can become significant. Also, many of these devices must be very accurately positioned with respect to the tool it is monitoring and care taken to ensure that it stays in that position. Since its position may be affected by vibrations of the machine tool and other causes, regular inspection is often necessary. Finally, many of these devices must be cleaned or replaced frequently, further contributing to their overall cost.

BRIEF SUMMARY OF THE PREFERRED EMBODIMENT

In the present invention, many of the above-mentioned problems have been overcome by providing a tool monitoring apparatus which basically consists of a magnetic circuit. This circuit includes a low reluctance portion and a high reluctance portion within which a pulsating magnetic flux is maintained. The high reluctance portion, which preferably comprises an air gap is sized to receive the tool to be monitored with substantially no clearance. In normal operation the device is positioned such that the tool will extend through and substantially bridge the air gap thus becoming part of the magnetic circuit and greatly reducing the reluctance of the circuit. When, however, the tool is not located in the air gap, as would be the case if it breaks or falls out of the machine, the gap is opened and the reluctance of the circuit will increase abruptly and significantly. This abrupt change in reluctance is monitored by suitable equipment to provide an indication of whether or not the tool is working properly.

Several significant advantages are attainable with this structure. Initially, it is not as sensitive to a messy environment as many prior art systems. The sensing circuit is responsive only to abrupt and significant changes in the reluctance and will not produce false signals because of metal chips and the like in the area of the sensor. Furthermore, the present device is very flexible and readily adaptable for use with tools of various shapes and sizes. For example, it is not limited to the monitoring of tools having varied cross-sections such as many prior art devices including the above-mentioned U.S. Pat. No. 3,310,796 to Sanders which is responsive to changes in reluctance caused by the effect of drill rotation in a permanent magnetic field. In this regard, also, the sensing structure as manufactured is enclosed within a hermetically sealed housing and furnished to the machine tool operator in that form whereby the operator need only drill a hole of the appropriate size through the housing to define the proper air gap spacing for the particular tool to be monitored. In the prior art, most units are built for only one tool of a particular size and many different units must be provided for different sized and shaped tools. In the present invention, on the other hand, a very few units are sufficient to accommodate a great many tool sizes and shapes which enables the present device to be manufactured quite economically. Furthermore, extreme accuracy in the alignment and positioning of the present device is not required. It is only necessary that the tool being monitored be approximately the same size as the air gap in the magnetic circuit such that it will substantially close the gap. For this reason, also, normal wear of the sensing structure will not affect accurate operation and it will last for a long period of time before replacement becomes necessary. The present device is also substantially self-cleaning and very simple in design making it highly reliable and in general is a compact, inexpensive and accurate system for use in monitoring the condition of a tool.

BRIEF DESCRIPTION OF THE DRAWINGS

FIG. 1 schematically illustrates a monitoring apparatus in accordance with the present invention shown in conjunction with a drill bit being monitored.

FIG. 2 illustrates the tool monitoring structure as manufactured and prior to its being adapted for use with a particular tool.

FIG. 3 illustrates an important feature of the monitoring structure.

FIG. 4 illustrates suitable circuitry that may be employed with the present invention.

DETAILED DESCRIPTION OF THE PREFERRED EMBODIMENT

In the following discussion, the present invention will be described primarily as it relates to a system for monitoring the condition of a drill bit as might be incorporated within an automated machine tool. It should be understood, however, that the invention is intended to include the monitoring of a wide variety of tools and other elements which may be utilized in many types of equipment.

FIG. 1 illustrates, somewhat schematically, a preferred embodiment of the monitoring system of the present invention in association with a drill bit being monitored. Reference number 1 refers generally to the sensing portion of the monitoring system which includes a substantially U-shaped member 2 having secured to its ends a pair of tapered pole pieces 3 and 4. Elements 2, 3 and 4 are all constructed of a relatively low reluctance magnetic material and may be formed from a single piece if desired, however, for ease in manufacture, the U-shaped portion 2 is preferably constructed of iron, Ferrox Cube or the like, while pole pieces 3 and 4 are made from a separate piece of soft, cold rolled steel as explained hereinafter. Pole pieces 3 and 4 are tapered as shown in FIG. 1 for a reason also to be described more fully hereinafter and define an air gap 5 which is adapted to receive the drill bit 18 to be monitored. Wound around U-shaped member 2 in inductive relationship therewith is a first input coil or winding 6 having a pair of terminals 7 and 8 and a second output coil 9 having a pair of terminals 11 and 12. Coupled across terminals 7 and 8 of coil 6 is a primary driver 13 which preferably comprises a source of alternating current. In the preferred embodiment, coils 6 and 9 consist of about 250 turns of 36 AWG wire, however, this is not at all critical to the invention.

As is recognized by those skilled in the art, elements 2, 3 and 4 together with air gap 5 defines a magnetic circuit which provides a path for a magnetic flux which may be induced within the circuit by the application of a pulsating voltage across terminals 7 and 8 of input coil 6. As further understood by those skilled in the art, this magnetic flux will, in turn, induce a voltage across the terminals 11 and 12 of output coil 9 which will be proportional to the strength of the magnetic flux within the circuit. To complete the monitoring system, appropriate detecting electronics 14 are coupled across terminals 11 and 12 to monitor this induced output voltage and to actuate a suitable relay 16 upon the occurrence of an appropriate signal.

Still referring to FIG. 1, the sensing portion 1 may basically be considered to be a transformer including a primary winding 6, a secondary winding 9, and a ferro magnetic core made up of U-shaped element 2, tapered portions 3 and 4, and air gap 5. Although the elements 2, 3, and 4 are all constructed of materials having a relatively low reluctance, the air gap has a relatively high reluctance and thus a relatively weak magnetic flux will be set up within the core and a substantially low output voltage will be induced across the terminals of coil 9. When, however, this air gap is substantially bridged or closed by a magnetic material such as the drill bit 18, the reluctance of this portion and thus of the entire circuit will drop and significantly increase the output voltage. In other words, the drill bit changes the transformer from one that is inefficient to one that is efficient and it is this characteristic that is employed in the present invention.

Referring again to FIG. 1, the transformer or sensing portion 1 is mounted on the drill apparatus and preferably to a bushing (not shown) spaced a slight distance from the work piece 17 to be treated as understood by those skilled in the art. Its position is such that the drill bit 18 to be monitored will be in alignment with the air gap 5, which has previously been sized to receive the drill bit as explained hereinafter. Appropriate structure, schematically represented at 19 is provided to move the drill bit against the work piece 17 and to then retract it at the end of the drilling operation to allow the next work piece to be moved into position. Usually, sensing portion 1 is positioned such that the drill bit will remain in the air gap at all times during its back and forth movement (indicated by the arrow A in FIG. 1) and as long as it remains in that position the gap will be substantially closed and the output voltage across the terminals 11 and 12 will be at a substantially high value, indicating that the drill is properly working. If, however, the drill bit were to break or somehow fall out of the machine, the air gap will open, at least during some portion of the movement of the bit, and the reluctance of the circuit will immediately increase thus rapidly and significantly reducing the voltage across the terminals 11 and 12. This abrupt decrease in voltage is monitored by the monitoring electronics 14 which actuates a relay 16 to either shut the entire machine off or actuate a signal to inform an operator that the machine is working improperly. As will be described with reference to FIG. 4, the monitoring circuit is sensitive only to significant changes in the output voltage and thus will not be effected by minor fluctuations due to metal chips stray magnetic fields or the like.

FIG. 2 illustrates the sensing portion of the present invention as manufactured and prior to its being adapted for use with a particular tool. As shown, sensing portion 1 is secured within an enclosed housing 21 by means of an epoxy cement or other suitable material. This housing, which may be of aluminum, plastic or the like, includes a top and bottom portion joined together at 22 to form a unit that is completely enclosed with the exception of a suitable opening 23 to receive a cable 24 to carry the necessary wires to permit electrical coupling with the remaining components of the system. This enclosed unit is hermetically sealed to prevent contaminents from getting into the system and is also coated with a layer of Mu-metal or the like to help isolate the device from stray magnetic fields.

This entire unit may be purchased by the machine tool operator in this form and be easily prepared by him to monitor the particular drill or other tool to be monitored in the following manner. Initially, he drills a hole through the entire unit utilizing the mark 26 made on the housing as a guide to provide the proper sized air gap to receive the tool. As shown, tapered elements 3 and 4 are actually formed from a single piece having a narrow joining portion 27 which is drilled away in forming the air gap. The gap should be drilled to approximately the same size as the drill bit to be monitored such that the drill bit will be in contact with pole pieces 3 and 4 while it is rotating and in some cases, the drill bit to be monitored may itself by used to drill the initial hole.

By tapering the pole pieces 3 and 4 it becomes possible to maintain approximately one-half the circumference of the drill bit in contact with the pole pieces irrespective of the size of the drill bit to be monitored. This large amount of contact will ensure substantial closing of the air gap for all drill sizes and permit the obtaining of a substantially high output voltage signal in normal operating conditions. This is illustrated more clearly in FIG. 3 which shows the relationship between the drill bit being monitored and the tapered pole pieces. As can be seen, a drill bit 18 would have approximately one-half its circumference in contact with pole pieces 3 and 4. In a similar manner, a larger diameter drill bit 18a would still have about one-half its circumference in contact with the pole pieces due to their tapered construction. Thus, the present device can readily accommodate drill bits of varying sizes without any loss in sensitivity.

It should be clearly understood, however, that actual physical contact is not essential to the proper operation of the invention and that a clearance can be tolerated. In fact, the drill bit will gradually wear away the ends of the soft steel tapered pole pieces during use. However, since certain amounts of clearance can be tolerated the sensing device will last for a long period of time before replacement is required.

A typical sensing unit as illustrated in FIG. 2 can readily accommodate drill bits ranging in size from about 1/32 to ¼ inch in diameter by merely varying the size of the air gap that is drilled. Different units can readily be provided for different ranges. Thus, this device is much more versatile than most prior art monitoring systems which must be substantially custom-made to the particular tool that it is intended to monitor. The entire unit itself is quite compact, on the order of 1½ inches in diameter and ¼ - ⅛ inch thick and thus does not occupy very much space.

After the air gap is formed, the unit is secured to the machine tool in the appropriate position, the terminals of coils 6 and 9 are coupled to the primary driver and the detecting electronics, respectively, and this system is then ready for operation. The unit may be secured to the machine tool in various well-known ways. For example, as shown in FIG. 2 a pair of holes 25 may be drilled through the unit in a region away from the magnetic circuit for securing it to a bushing or the like by means of bolts or screws.

FIG. 4 schematically illustrates the monitoring circuitry that may be employed in the present invention. Reference numeral 13 represents the primary driver for producing an alternating current voltage across the terminals 7 and 8 of coil 6 (FIG. 1) As illustrated, this same source may be utilized to drive a plurality of sensors 1, 1a, 1b, 1c, etc., by merely coupling the various sensors in series. The alternating current voltage signal applied to the input windings of the sensors will induce an alternating magnetic flux in the magnetic circuit formed by elements 2, 3, 4 and 5 (FIG. 1) as explained previously. This magnetic flux will in turn induce an output voltage across the terminals of output winding 9 that is proportional to the strength of the magnetic field. This output signal is first fed into a suitable rectifier and voltage doubler circuit 32 to produce a high voltage pulsating D.C. signal that may be more easily monitored. This rectified signal then passes to low pass filter circuit 33 to provide a substantially smooth output signal. This filtered signal then passes to a suitable threshhold device 34 which is responsive to significant changes in the magnitude of the signal applied to it but will ignore slowly varying signals. When the magnitude abruptly drops below a predetermined value, caused by withdrawal of the drill bit from the air gap, a signal is transmitted to the relay 16 which may either actuate a signaling device or shut off the machine tool.

Thus a system is provided that is responsive only to significant changes in the reluctance of the magnetic circuit caused by withdrawal of the drill bit from the air gap and will not be improperly actuated by false signals caused by stray magnetic fields and the like.

Although the invention has been described primarily as a system for detecting the existance of a broken or lost drill bit by monitoring its presence or absence within a magnetic circuit, it should be understood that the invention may readily be adapted to perform other functions. For example, in certain operations it might be desirable to have the tool fully withdraw from the air gap at certain periods without actuating the monitoring system. This may readily be accomplished in various well-known ways. In addition the present invention might also be used to detect the presence of non-ferrous conductive elements. Materials of this type would have the effect of increasing the reluctance of the air gap and weaken the field by increasing eddy currents within the magnetic circuit and by slight modification of the detecting electronics these may also be monitored.

In conclusion the present invention provides a reliable compact, inexpensive, and versatile system for monitoring tools to ensure that they are always working properly.

While a preferred embodiment of the invention has been described, the teachings of this invention will readily suggest many other embodiments to those skilled in the art. Accordingly, it should be understood that numerous alterations, omissions, and additions may be made without departing from the spirit thereof and the invention should be limited only as required by the scope of the following claims.

We claim

1. Tool monitoring apparatus comprising:
   a. a housing; and
   b. sensing means positioned within said housing for sensing an elongated tool which may be of diverse widths and which is to be positioned through said housing and said sensing means, said sensing means including:
      1. a magnetic circuit having a pair of aligned tapered pole portions between which an air gap for receipt of said tool to be sensed is to be formed by removing sufficient amounts of said tapered portions to provide an air gap having a width substantially identical to that of said tool to be sensed;

2. an input winding in inductive relationship with said circuit and having a pair of input terminals adapted to be coupled to a source of pulsating voltage; and 3. an output winding in inductive relationship with said circuit and having a pair of output terminals adapted to be coupled to a monitoring circuit.

2. Apparatus as recited in Claim 1 wherein said aligned tapered pole portions are joined together by a connecting portion which is adapted to be removed along with sufficient amounts of said tapered portions to form said air gap.

3. Apparatus as recited in Claim 1 wherein the narrowest ends of said tapered portions define the width of said air gap to be formed such that the width of said air gap may be adjusted in size to receive tools of different widths while ensuring substantial contact between said tool and said pole portions irrespective of the width of said tool.

4. Apparatus as recited in Claim 1 wherein said housing includes indicia means for identifying the position at which said air gap is to be formed through said housing and said circuit.

5. A method for monitoring the condition of movable elongated tools which may be of diverse widths comprising the steps of:

a. providing a magnetic circuit means through which said tool to be monitored is to be passed, said magnetic circuit means including a low reluctance portion;

b. removing sufficient amounts of said low reluctance portion to provide an air gap having a width substantially identical to the width of the tool to be monitored;

c. passing said tool to be monitored through said air gap; and d. monitoring the reluctance of said magnetic circuit means and generating a signal upon a change in the reluctance thereof indicative of the improper condition of said tool.

6. A method as recited in claim 5 wherein said tool to be monitored comprises a drill and wherein said removing step comprises drilling a hole through said low reluctance portion with said drill to be monitored.

7. A method as recited in claim 5 wherein said low reluctance portion includes a pair of aligned tapered pole portions and wherein said removing step comprises drilling away sufficient amounts of said pole portions to provide an air gap therebetween having a width substantially identical to the width of said tool to be monitored.

8. A method as recited in claim 5 wherein said magnetic circuit means is contained within a substantially enclosed housing and wherein said removing step comprises drilling through both said housing and said circuit means to provide said air gap for receipt of said tool to be monitored.

* * * * *